US005391420A

United States Patent [19]

Bootman et al.

[11] Patent Number: 5,391,420

[45] Date of Patent: Feb. 21, 1995

[54] FRAGRANCE-LADEN POUCH SAMPLERS AND PROCESS FOR THEIR MANUFACTURE

[75] Inventors: Matthew W. Bootman, Medfield; Daniel L. Brown, Wayland, both of Mass.; Elaine Trebek-Kares, Los Angeles, Calif.; Randall E. Adams, Billerica, Mass.

[73] Assignee: Thermedics Inc., Woburn, Mass.

[21] Appl. No.: 59,452

[22] Filed: May 7, 1993

Related U.S. Application Data

[60] Continuation-in-part of Ser. No. 893,521, Jun. 4, 1992, which is a division of Ser. No. 730,653, Jul. 16, 1991, abandoned.

[51] Int. Cl.$^{6}$ .................................................. B32B 9/00

[52] U.S. Cl. ...................................... 428/195; 428/40; 428/41; 428/42; 428/43; 428/68; 428/79; 428/194; 428/224; 428/246; 428/262; 428/317.5; 428/321.5; 428/352; 428/537.5; 428/905; 428/914; 424/76.3; 424/76.4; 424/486

[58] Field of Search ................. 428/40, 905, 354, 224, 428/352, 195, 246, 262, 41, 42, 43, 68, 79, 194, 317.5, 321.5, 537.5, 914; 239/56, 34; 424/76.3, 76.4, 486

[56] References Cited

U.S. PATENT DOCUMENTS

| | | | |
|---|---|---|---|
| 3,145,514 | 8/1964 | Shelley | 53/3 |
| 3,269,278 | 8/1966 | Olstad | 93/35 |
| 3,462,329 | 8/1969 | Beyer | 156/190 |
| 3,685,734 | 8/1972 | Paciorek et al. | 239/56 |
| 4,184,099 | 1/1980 | Lindamer et al. | 313/315 |
| 4,277,024 | 7/1981 | Spector | 239/36 |
| 4,283,011 | 8/1981 | Spector | 239/36 |
| 4,294,637 | 10/1981 | Rump | 156/157 |
| 4,359,358 | 11/1982 | Hattemer | 156/248 |
| 4,419,396 | 12/1983 | Sugimoto | 428/40 |
| 4,427,484 | 1/1984 | Cameron, Jr. et al. | 156/361 |
| 4,445,641 | 5/1984 | Baker et al. | 239/6 |
| 4,483,759 | 11/1984 | Szycher et al. | 204/159.24 |
| 4,606,956 | 8/1986 | Charbonneau et al. | 428/40 |
| 4,769,264 | 9/1988 | Dreger | 428/40 |
| 4,849,043 | 7/1989 | Instance | 156/227 |
| 4,874,129 | 10/1989 | Disapio et al. | 239/36 |
| 4,880,690 | 11/1989 | Szycher et al. | 428/224 |
| 4,884,680 | 12/1989 | Israel et al. | 206/44.11 |
| 4,889,755 | 12/1989 | Charbonneau | 428/42 |
| 4,908,252 | 3/1990 | Carnahan et al. | 428/27 |
| 4,940,584 | 7/1990 | Tararuj et al. | 424/401 |
| 4,941,574 | 7/1990 | Meehan | 206/466 |
| 4,961,493 | 10/1990 | Kaihatsu | 206/0.5 |
| 5,071,704 | 12/1991 | Fischel-Ghodsian | 428/354 |
| 5,093,182 | 3/1992 | Ross | 428/195 |

FOREIGN PATENT DOCUMENTS

| | | | |
|---|---|---|---|
| 0328003 | 8/1989 | European Pat. Off. | B65C 1/02 |
| 0431798 | 6/1991 | European Pat. Off. | B31D 1/02 |
| 7517416 | 6/1975 | France | B65D 27/04 |

*Primary Examiner*—Patrick J. Ryan
*Assistant Examiner*—Abraham Bahta
*Attorney, Agent, or Firm*—Fish & Richardson

[57] ABSTRACT

Label-like, hermetically-sealed perfume pouch samplers with artwork on their top surface and a pressure sensitive adhesive bottom surface. The adhesive bottom surface may be employed to attach the pouch labels to pages of a magazine or other mailer, providing an efficient method of mass distribution of perfume samples. The fragrance is stored in a perfume-releasing article such as an ultraviolet radiation-cured perfume-doped polymer, or a fragrance-laden polymer gel of modified cellulosic, ethyl alcohol, fragrance oil, an antioxidant, and water, surrounded by two perfume impervious sealed barrier layers. There is disclosed a method of manufacturing the perfume pouch labels on a support web that can be wound onto rolls from which the pouch labels may be readily released and applied rapidly and precisely to advertising pages.

23 Claims, 10 Drawing Sheets

FRAGRANCE-LADEN POUCH SAMPLERS AND PROCESS FOR THEIR MANUFACTURE

CROSS REFERENCE TO RELATED APPLICATIONS

This is a continuation-in-part of application Ser. No. 07/893,521, filed Jun. 4, 1992, which is a divisional of application Ser. No. 07/730,653, filed on Jul. 16, 1991, now abandoned.

BACKGROUND OF THE INVENTION

The field of this invention is distribution systems for sampling perfume, particularly sample pouches designed to carry small amounts of perfume for advertising purposes, for example as inserts in fashion magazines or as point-of-purchase samplers.

Compositions and devices designed to distribute a "sample" amount of a fragrance to potential customers are known. These known devices generally hold a perfume sample in a magazine where they either emit the fragrance continuously or contain the perfume in a fragile package. However, each of the known devices has some disadvantage which may include high cost, inadequate rate of and/or premature release of fragrance, difficulty in forming and maintaining a desired shape, or difficulty in preserving the quality of the fragrance in the sampling device.

One established device for sampling perfume delivered in magazines is known in the trade as the "Scent Strip". The process for making these devices involves microencapsulation of the fragrance in a manner similar to the microencapsulation of inks in carbonless forms. One drawback of these microcapsules is that they are fragile and tend to burst during shipping and handling of the magazines, resulting in unintentional release of fragrance.

Processing conditions for making devices which encapsulate perfume, such as heat, pressure, and chemical agents may make it difficult to maintain the integrity of the desired fragrance within the device. These disadvantages have led to a continuing search for improvements in fragrance-sample containers or devices.

When used in conjunction with a mailed article such as a magazine, a perfume pouch must remain firmly secured during transport. Firm adherence ensures that the pouch will actually reach the user. Further, it must remain sealed until opened by the user, to protect the user from unwanted release of fragrance. Of course, a good seal protects the perfume from leakage or contamination that could degrade the fragrance and quality of the pouch itself.

One possible method of securing a perfume emitting article to the page of a mailer is by an adhesive layer on the bottom side of the article. However, many known fragrances or perfumes used in conjunction with perfume emitting devices, especially oil based fragrances, can migrate to and/or through the adhesive layer that attaches the article to its position on a surface. The fragrance oil can mix with the adhesive as well as degrading the fragrance in the containing device. Fragrance oils can also "bleed through" to the mailer page.

A recent development in the technology of fragrance sampling is the perfume patch disclosed in U.S. Pat. No. 4,880,690, assigned to the assignee of the present invention, and whose disclosure is incorporated herein by reference to that patent. The perfume patch of that patent includes a barrier layer to prevent migration of the fragrances to an adhesive layer that attaches the patch to its position on a surface, such as the skin of a wearer or a page of a magazine, thereby preserving the internal strength of the adhesive and preventing unintentional release of fragrance.

However, neither that patent nor any other prior art known teaches an inexpensive, tightly-sealed fragrance sampler which can be manufactured readily, shipped, and handled without premature release of fragrance, then peeled for a sampling of the fragrance. The prior art also does not teach a mailable perfume pouch sampler of that type which also has artwork on its top surface, and which can be readily and precisely applied to a magazine page so as to become a part of the larger artwork on the magazine page.

Accordingly, it is an object of the invention to provide a tightly sealed and well-constructed mailable perfume pouch and pouch label containing fragrance oil without degrading the fragrance oil or the quality of the fragrance emitted.

Another object of the present invention is to provide a tightly sealed perfume pouch label that will not rapture or leak perfume, nor be exposed to air, during transport or handling.

Yet another object of the present invention is to provide a perfume pouch label that will remain firmly attached to a mailer or other surface during transport and handling so that a potential purchaser of the perfume can open the pouch label and sample the perfume.

Also another object of the present invention is to provide a well-sealed perfume pouch label whose perfume-containing member can be removed from a magazine and sampled.

Still another object of the present invention is to provide an efficient and economical method of manufacturing a well-sealed perfume pouch label with artwork on its top surface and which can be readily applied to a surface such as a magazine page.

A further object of the present invention is to provide an inexpensive means to entice potential perfume customers to sample perfume.

Yet another object of the invention is to provide a perfume containing pouch label that offers an advertiser more creativity in allowing the pouch label to be printed and die cut to match or become part of the advertising art.

Still another object of the invention is to provide an inexpensive yet effective means for disseminating sample quantities of perfume through the mail and/or as a magazine insert in a structure which can be opened to release the fragrance.

SUMMARY OF THE INVENTION

The present invention is a tightly-sealed, peelable perfume pouch label which includes a pressure sensitive adhesive back and a process for manufacturing such pouch label which facilitates its attachment to a magazine or other mailer. The pouch label (or pouch if no pressure-sensitive adhesive back is included) contains perfume which may be stored in a perfume-doped layer carried between two barrier members which prevent unwanted release or migration of fragrance or its oils. The top barrier member is peelably removable for sampling of the perfume stored within the pouch. Artwork may be provided on a surface of the top barrier member to match or become part of a larger artwork on a magazine page to which the pouch label is attached; in that embodiment the pressure-sensitive adhesive, the perfume-doped layer, and the bottom barrier member are preferably transparent or translucent so that the artwork on the magazine page beneath the pouch label can be viewed through them once the top barrier member is removed from the pouch label.

A preferred perfume-doped layer is a fragrance-laden polymer gel formed of fragrance oil; ethyl alcohol; water; a polymer which is soluble in amounts up to ten percent (10%) by weight individually in the fragrance oil, ethyl alcohol, and water; and an antioxidant. The polymer is preferably a modified cellulosic, and the polymer gel preferably has a formulation, in percent by weight, as follows: fragrance oil (10–40), ethyl alcohol (30–70), modified cellulosic (0.1–10), antioxidant (0–0.1), balance water. After the top barrier member is peeled from the pouch label, fragrance is released from the polymer gel, the alcohol quickly evaporates, and the remainder of the polymer rapidly (e.g., in less than about one minute) dries to a solid or semi-solid film.

A preferred method of manufacturing the perfume pouch label in accordance with the present invention is a nine zone process. In zone one, a bottom barrier member is continuously laid down onto a continuous web having a releasable adhesive coating. In zone two, perfume is applied to the surface of the lower barrier member, as by zone-coating selected areas with a perfume doped oligomer similar to that taught in U.S. Pat. No. 4,860,690, and then in zone three, the oligomer patches are cured with ultraviolet radiation into patches of perfume-releasing polymer. In zone four, a second layer or top barrier member is deposited on the surface of the web/adhesive/bottom barrier/perfume-doped polymer structure. In zone five, the top and bottom barrier members are heat sealed forming a continuous hermetic sealed area enclosing each perfume doped polymer patch and preferably leaving an unsealed comer of each patch to produce a tab for peeling. In zone six, artwork is printed on the top barrier member. In zone seven, the structure is die cut at areas all around the multiple hermetically-sealed perfume-doped polymer patches. The depth of the cut is up to but not penetrating the support web so as to produce separate sealed perfume pouch labels, with unsealed tabs, affixed to the uncut support web. In zone eight, the waste material outside the perimeters of the perfume pouch labels is stripped away leaving separate pouch labels secured to the support web and having individual "peel-away" tabs. In zone nine, the support web is slit to form strips of desired widths and the strips are wound onto rolls containing perfume pouches for subsequent machine attachment to surfaces such as pages of magazines.

DESCRIPTION OF PREFERRED EMBODIMENTS

At the outset, the invention is described by its broadest overall aspects with a more detailed description following. The invention is a tightly-sealed and economical fragrance emitting perfume pouch label or pouch, formed with two barrier members or layers sealed together and optionally readily attachable to most surfaces by an adhesive located directly below the bottom barrier member. Positioned between the barrier members is perfume, preferably in the form of zones or patches of cured perfume-containing oligomer coated onto the top surface of the bottom barrier member. Each barrier member is constructed of materials that are impermeable to outflowing perfume vapors and liquids as well as inflowing oxygen, and yet capable of being sealed together. At least one of the barrier members is peelable and removable from the other barrier layer so as to release the perfume fragrance stored in the pouch.

The top barrier member also may include paper in its upper structure so that artwork can be applied to the paper surface. With creative artistry, the artwork can suggest to the user to detach the pouch label from the mailer and apply the perfume to the skin. Moreover, the bottom barrier member, cured oligomer patches, and adhesive may be transparent and the artwork on the top barrier member may be identical to that on the portion of the page to which the pouch label is attached so that removal of the top barrier member releases the fragrance without disruption or alteration of the artwork seen by the reader.

A preferred use of the perfume pouch label of the present invention is the economical, efficient, and visually stimulating distribution of fragrance samples to the public through placement in various magazines and other consumer articles. The pouch label may be permanently affixed to the consumer article or may be removably attached so that consumers can remove the pouch label or perfume-containing portion of the pouch label from the article and apply the perfume directly to the skin.

A method for manufacturing the perfume pouch label in accordance with a preferred embodiment of the present invention is a nine zone manufacturing method. The first three zones can be somewhat similar to those disclosed in U.S. Pat. No. 4,880,690.

Figure 1:
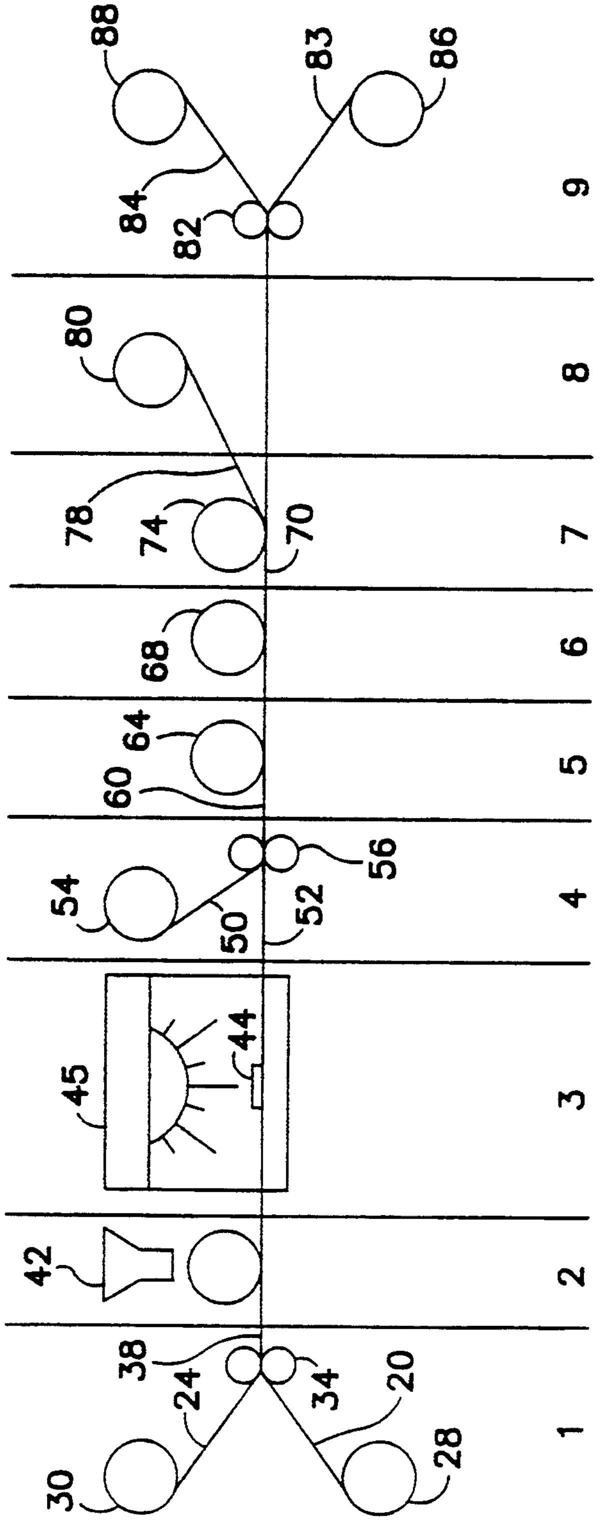
FIG. 1 is a schematic diagram that illustrates the method for manufacturing a finished roll of magazine attachable perfume pouch labels in accordance with a preferred embodiment of the present invention.
Figure 3:
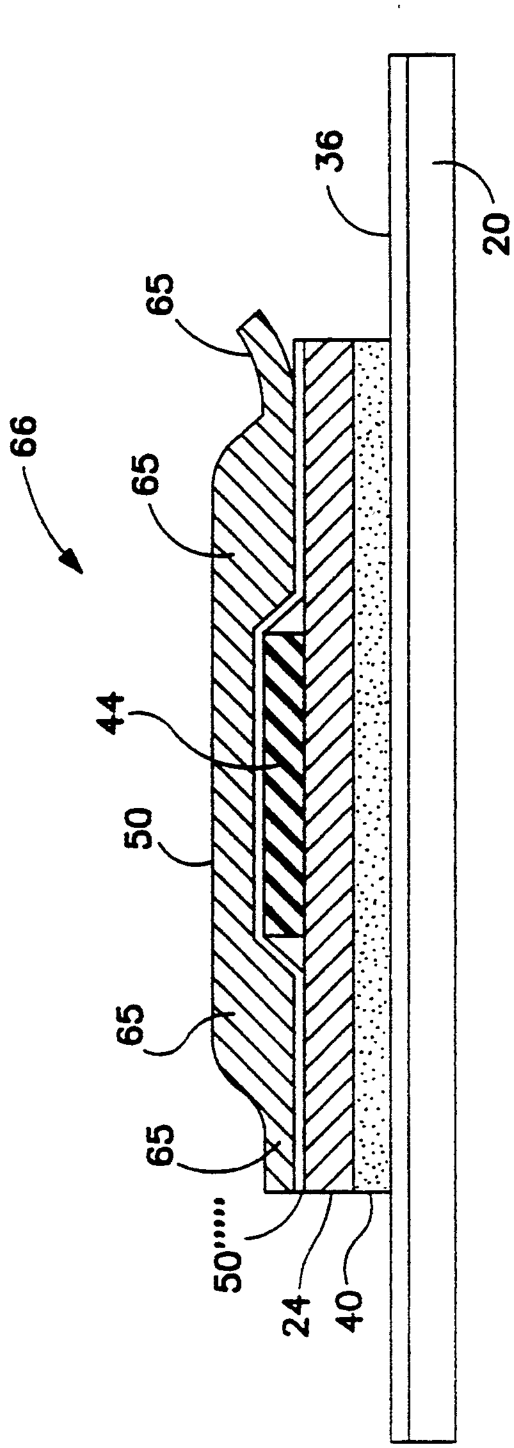
FIG. 3 is a cross-sectional view taken along line 3—3 of FIG. 2 of a perfume pouch label affixed to the support web.

With reference to FIG. 1, which illustrates a preferred manufacturing method, in zone 1 an adhesive coated support web 20 and a barrier member 24 are unwound from rolls 28 and 30 respectively, and are pressed together by passing through nip rolls 34. The support web is preferably made of silicone-coated 30–40# (weight) release paper 20 or silicone-coated Mylar sheet with an adhesive coating 40 on its upper surface and a release coating 36 between the web 20 and the adhesive coating 40 (see FIGS. 3 and 4). The silicone coating 36 (see FIG. 3) on the support web or paper 20 acts as a release liner, allowing clean removal of the adhesive from the support web, thereby resulting in the maintenance of the integrity of the adhesive on the barrier member 24 when the paper 20 is removed during operation of automated label application machinery to apply perfume pouch labels to specific areas of magazine pages or to other surfaces. The barrier member 24 is a thin layer or laminate of material(s) suitable for preventing migration or seepage of perfume to the adhesive, for preventing oxygen from moving inside the pouch, and for hermetically sealing, as by heat, to another member. One preferred barrier member 24 is a laminate of polyethylene 24', nylon 24", and polyethylene 24'''. The polyethylene 24', 24''' or like material and nylon 24" in the barrier layer, as used in the present invention, eliminate potential seepage of the perfume to the adhesive layer and the diffusion of oxygen to the inside of the pouch label, which would degrade the integrity of the adhesive and fragrance, respectively. Alternatively, the barrier member 24 may consist of a laminate of "Saran" polyvinylidene dichloride (PVDC) type material ("Saran" is a registered trademark of Dow Chemical & Plastics Company), nylon, and polyethylene or any paper and/or polymer laminate having an element such as polyethylene on its top side for heat sealing and having an element which acts as an impervious barrier to fragrance oils and oxygen such as metal foil or "Saran". In one important embodiment of the invention, barrier member 24 is transparent, as is the adhesive 40 transferred from the support web 20 so that the surface to which perfume pouch label 66 is attached may be seen through the barrier member 24. The barrier member 24 may in some applications consist of a single layer such as Saran (PVDC) material.

Figure 4:
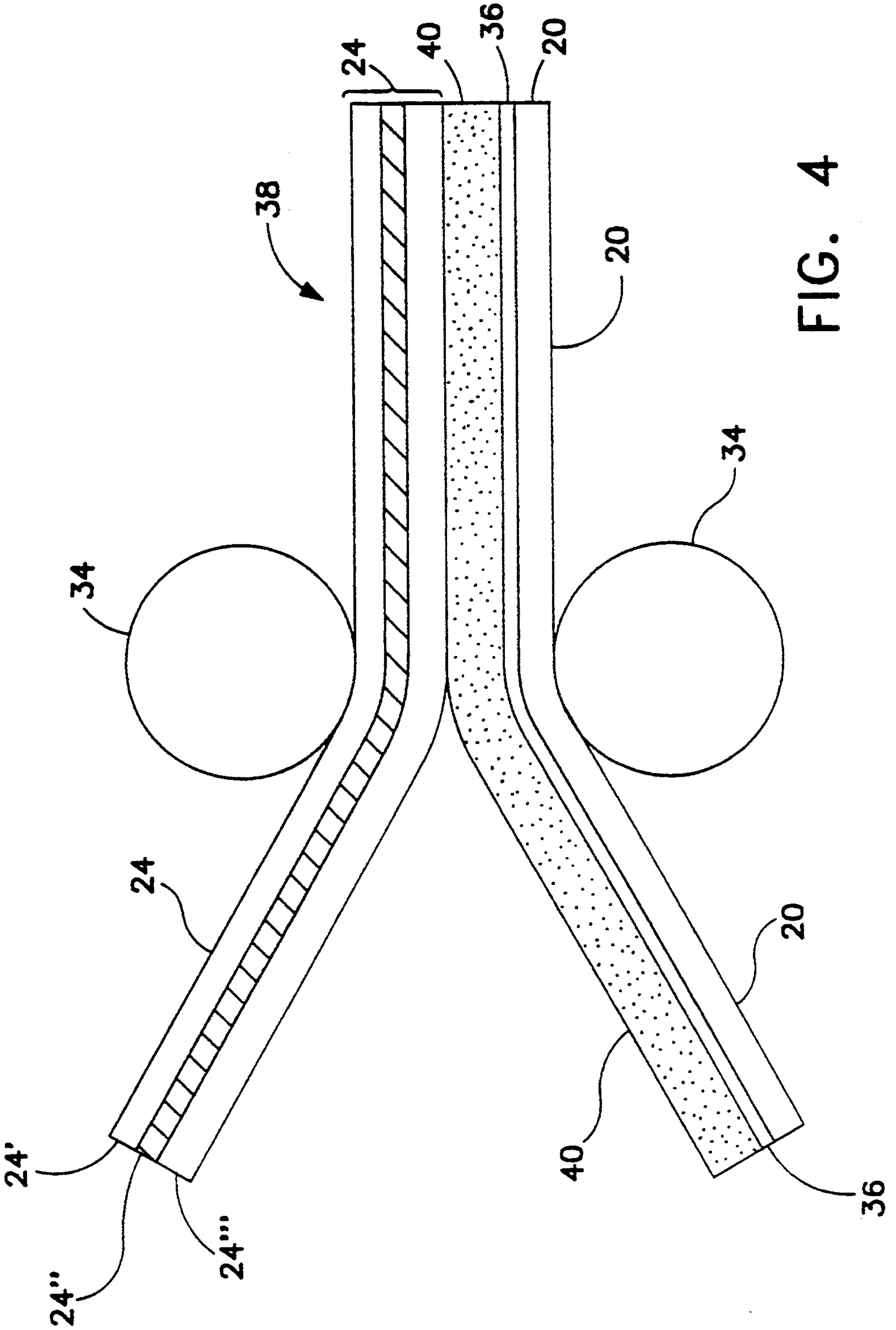
FIG. 4 is a schematic diagram of a portion of the process of forming perfume pouch labels and showing a cross-sectional view of an intermediate product formed when the bottom barrier member is deposited onto the adhesive-coated support web.

Roll 30 feeds the barrier member 24, while roll 28 feeds the silicone coated 30–40# paper support web 20 with the adhesive 40 on its top surface, through the nip rolls 34. (The support web 20 preferably already contains an adhesive before unwound from the roll 28 in zone 1). FIG. 4 shows the support web/barrier member structure 38 after passage through nip rolls 34, with adhesive 40 lodged between the barrier member 24 and the silicone coating 36 on the support web 20.

Figure 5:
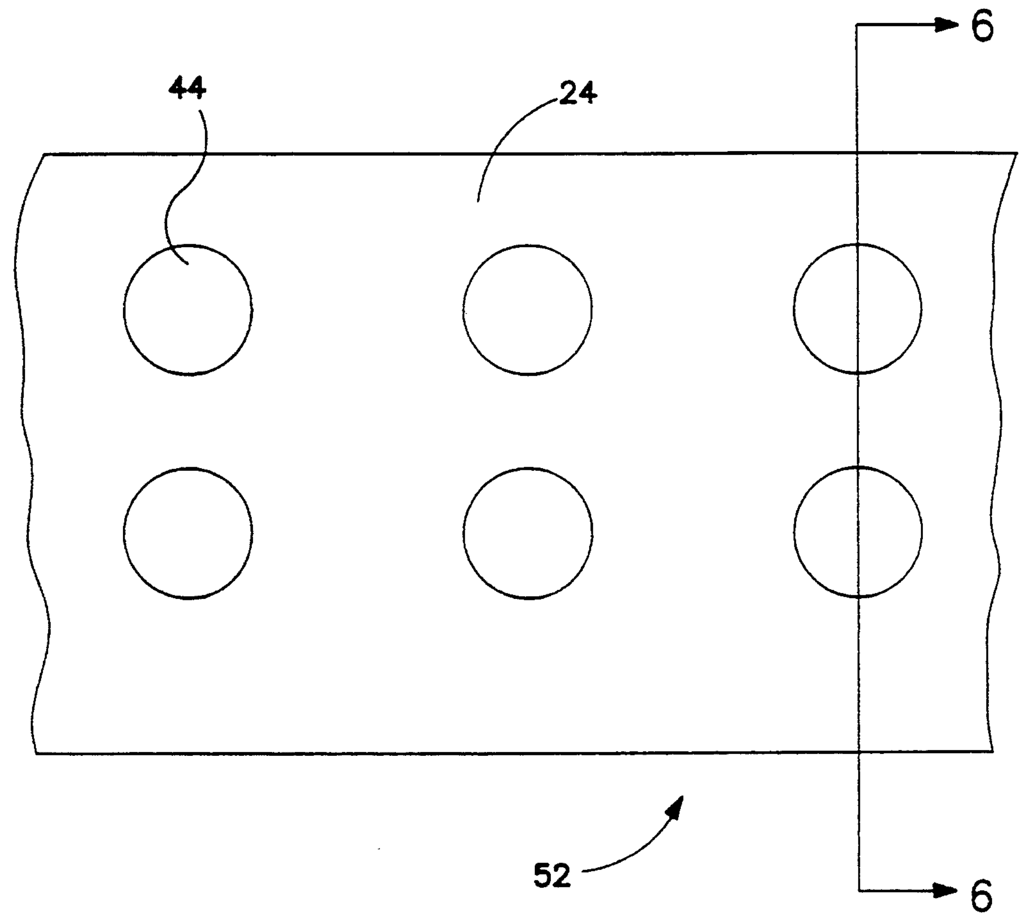
FIG. 5 is a top plan view of the intermediate product following application of perfume or perfume containing article to the bottom barrier member.
Figure 6:
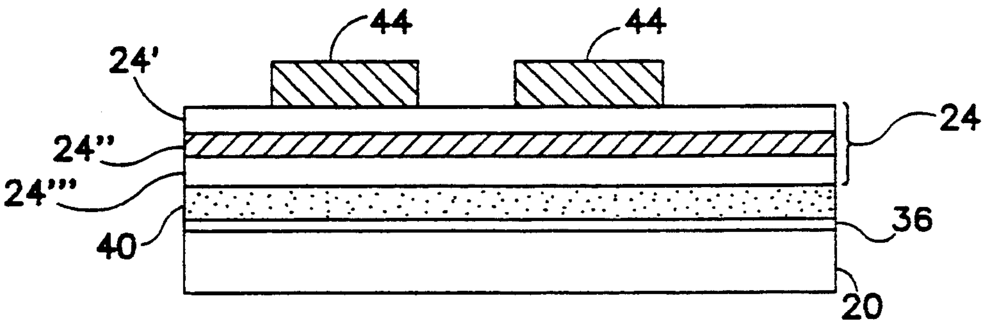
FIG. 6 is a cross-sectional view taken along line 6—6 of FIG. 5 of the support web/barrier/perfume structure.

In zone 2 of the process shown in FIG. 1, the top surface of the member 24 (hereafter referred to as the bottom barrier member 24) is zone-coated, as to a thickness of 0.001–0.005 inches, with perfumed-doped oligomer using a suitable applicator 42 such as a gravure coater, screen coater, or glue applicator apparatus. The oligomer and the method for its preparation and curing may be as disclosed in U.S. Pat. No. 4,880,690, and the perfume or fragrance may be dispersed in the oligomer by stirring. It should be noted, however, that the invention is not limited to the use of perfume doped oligomers; indeed, pure perfume can be dropped onto the structure if there is no need to solidify or cure the perfume-containing medium to solid or semi-solid patches. FIGS. 5 and 6 show a number of perfume-doped oligomer patches 44 positioned on the bottom barrier member 24 after coating of the member 24 in zone 2.

In zone 3 of the process shown in FIG. 1, the perfume doped oligomer patches 44 are U.V.—cured into solid polymer patches. This is done through exposure of the perfume doped oligomer patches 44 to ultraviolet radiation, as from U.V. lamp 45 positioned above the bottom barrier member 24 being drawn through the perfume pouch-making apparatus of FIG. 1. This contains the perfume in a solid polymer matrix to prevent inadvertent physical transfer of perfume to other surfaces after the pouch label is peeled during use. A variation in zone 2 can be the application of drops of perfume oil, or a perfume sponge, or an article with microcapsules of perfume, or any flat article ("chip") impregnated with or containing perfume, instead of the perfume doped oligomer in which case no curing (zone 3) is required.

Figure 7:
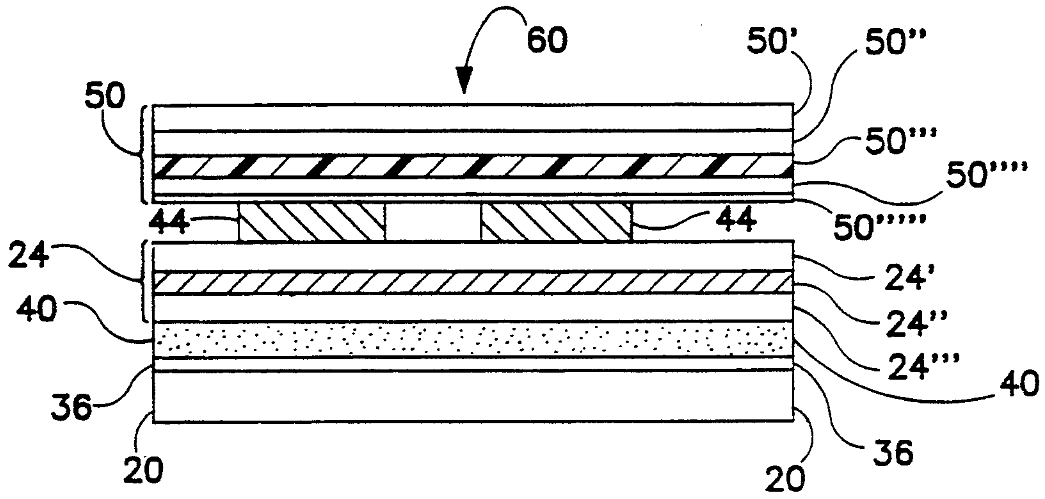
FIG. 7 is a cross-sectional view of the intermediate product following application of the top barrier member to the top of the structure.

In zone 4 of the process shown in FIG. 1, a top barrier member 50 is added to the support web/polymer-coated bottom barrier member structure 52. The top barrier member 50 is fed from a roll 54 and is passed with the structure 52 through nip rolls 56 which press the member 50 and the structure 52 together to form intermediate structure 60. A preferred embodiment of the top barrier member 50 (FIG. 7) is a laminate of paper 50', polyethylene 50", metal foil 50''' and polyethylene 50", coated with a low melt temperature polymer 50'''' such as EVA (ethylene vinyl acetate) or an ionomer with paper forming the top surface so that printing may later be applied. FIG. 7 shows the intermediate product 60 after passage through the rolls 56 of zone 4 wherein the top barrier member 50 lies above the multiple cured polymer patches 44 positioned on the surface of the bottom barrier member 24 which in turn is adhered to the support web 20.

Figure 2:
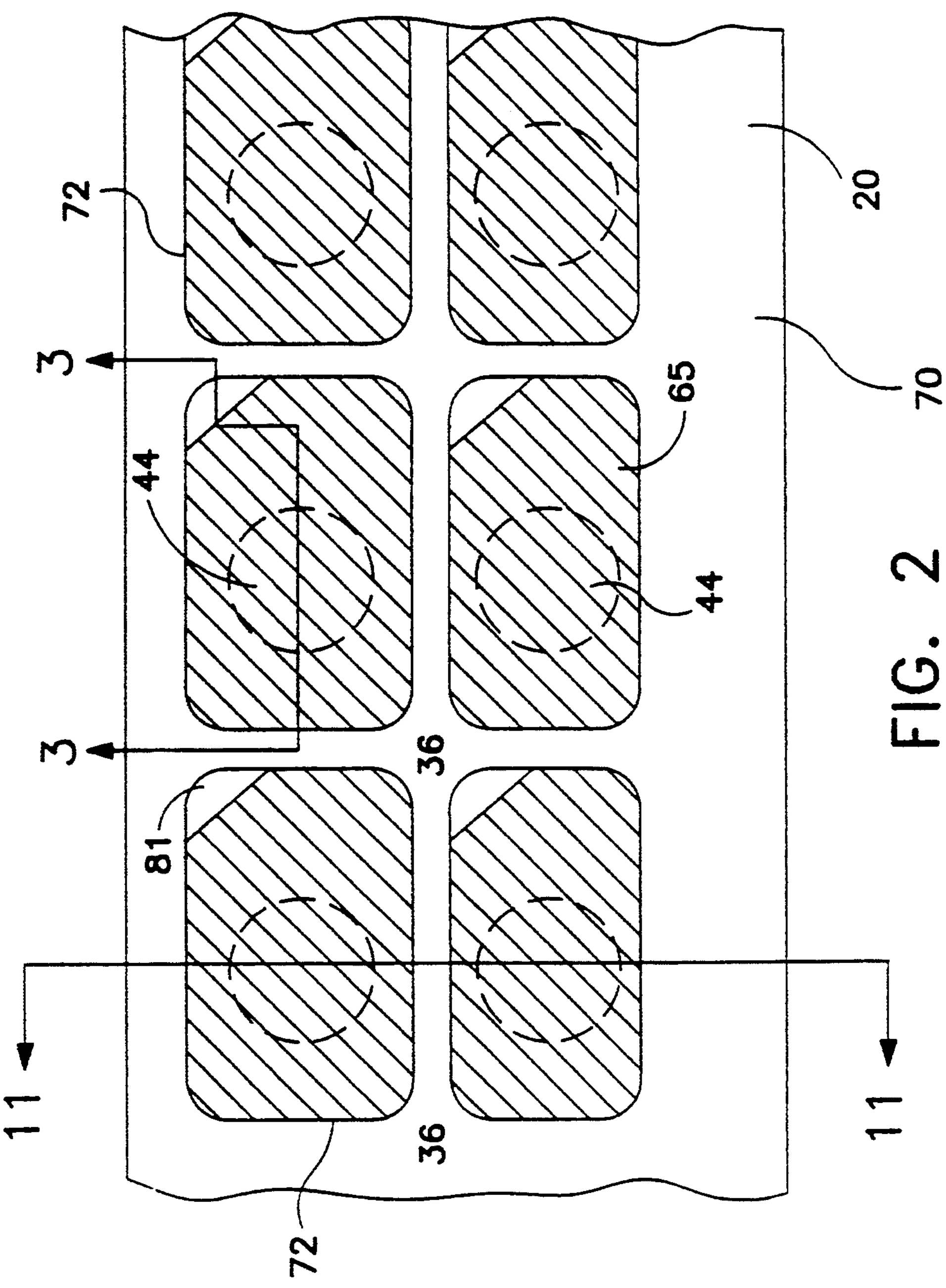
FIG. 2 is a top plan view of perfume pouch labels made in accordance with the process shown in FIG. 1 before the support web is slit into strips for roll formation and without showing any artwork on its top surface.
Figure 8:
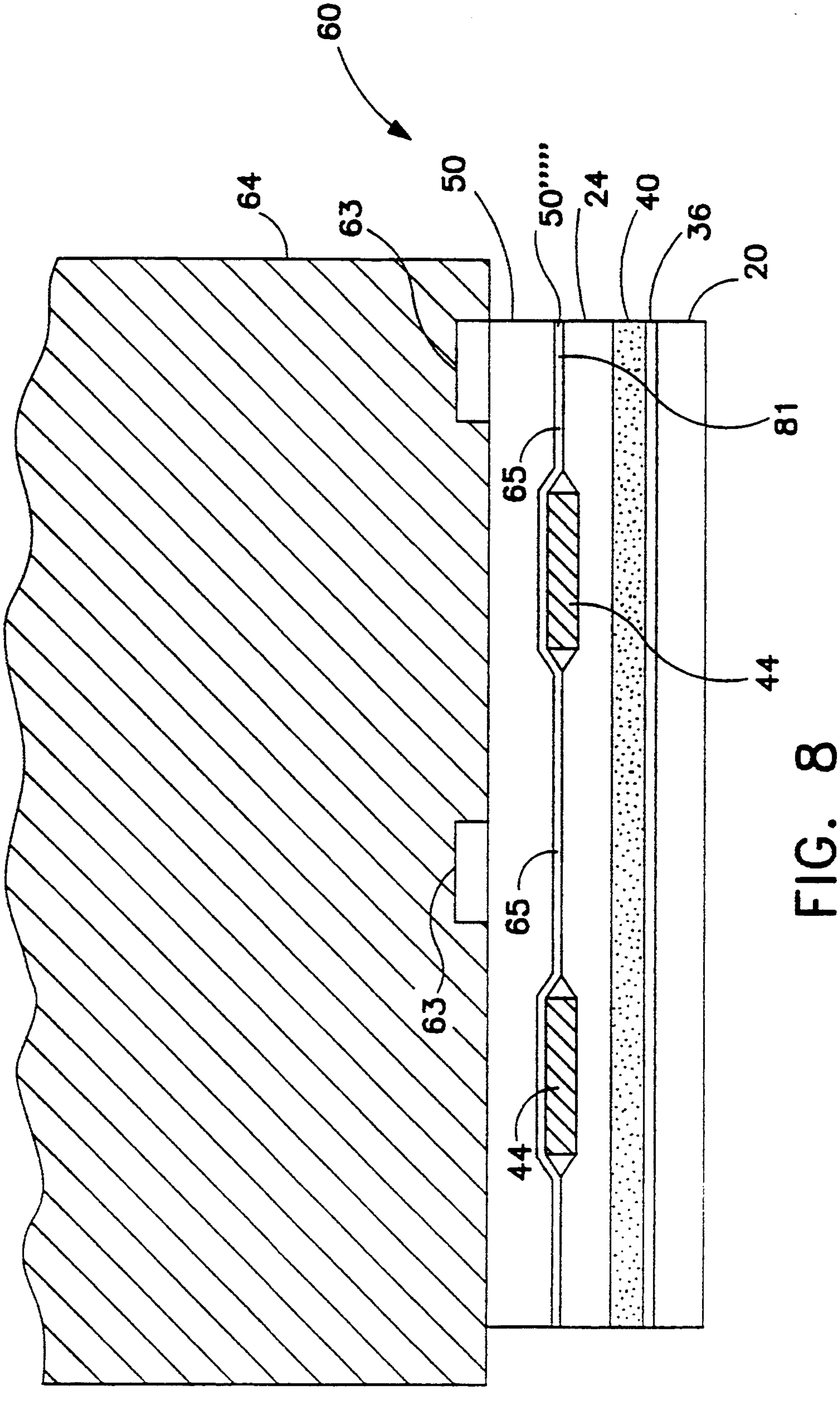
FIG. 8 is a schematic diagram of a preferred process of sealing the perfume pouch and a cross-sectional view of the intermediate product being heat sealed.
Figure 9:
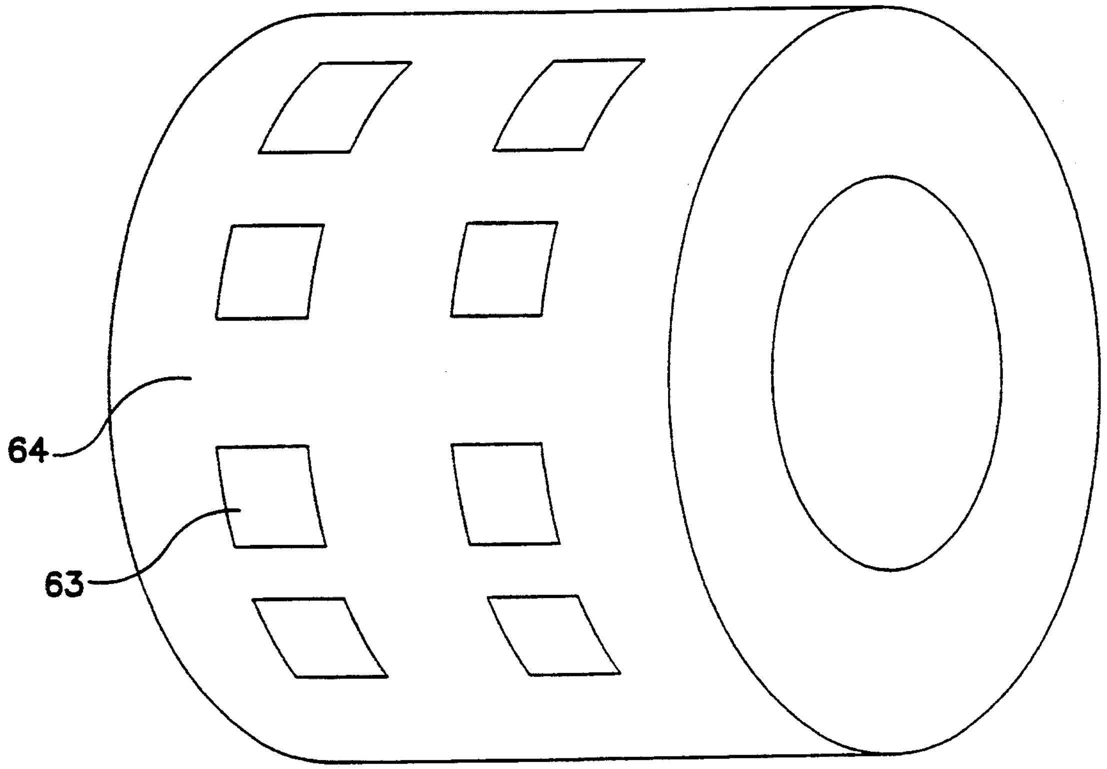
FIG. 9 is a view in perspective of a rotary heat sealing die for sealing the top and bottom barrier members to each other to form a hermetically sealed perfume pouch label.

In zone 5 of the process shown in FIG. 1, the multiple layered, perfume-doped polymer structure 60 of FIG. 7 is heat-sealed. As shown in FIG. 8, the structure 60 may be heat-sealed with a rotary heat sealing die 64 (FIG. 9), which results in a continuous hermetic seal 65 (also see FIG. 2 and FIG. 3) around each perfume-doped polymer patch 44. Preferably the die 64 has spaced recesses 63 so as to leave a comer of each perfume pouch label 66 unsealed to facilitate later removal of its top barrier member 50. In FIG. 2, the sealed areas 65 (remaining after matrix-stripping in zone 8) are shown shaded for illustration purposes and the perfume-doped polymer patches 44 are drawn in phantom. The heat-sealing die 64 uses heat and pressure to fuse the top and bottom barrier members 50 and 24 via the low melt temperature coating 50'''' applied to member 50. At this stage, the hermetic seal 65 covers the entire area of the web excluding the comers left unsealed by the die recesses 63.

In zone 6 of the process shown in FIG. 1, artwork is printed on the paper surface 50' of the top barrier member 50 of the perfume pouch labels 66 by a printer 68. Any suitable printing process, such as flexographic, rotary letterpress, or rotogravure, may be utilized.

In zone 7 of the process shown in FIG. 1, the multiple-layered, perfume-doped polymer sealed-pouch label structure 70 from zone 6 is die cut by means of dies 74 to allow removal of excess material 78 and to further separate individual perfume pouch labels. The depth of the cuts 72 is up to but not penetrating the support web 20 of the structure 70. The cuts 72 are made in the spaces surrounding the multiple hermetically sealed perfume doped polymer patches and include a small unsealed area 81, thereby creating a tab which may be used to release the fragrance. Those skilled in the art know this technique as "kiss cutting". Since the support web 20 is not cut, the entire structure is held together for processing in subsequent zones.

Figure 10:
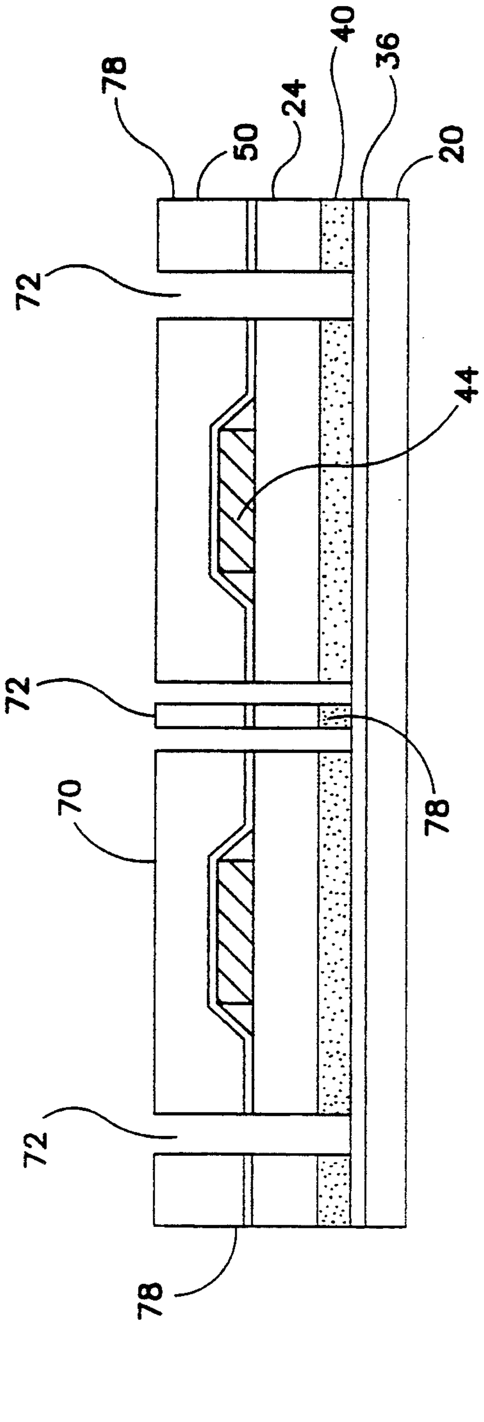
FIG. 10 is a cross-sectional view of the product after being die cut thereby making separate perfume pouch labels affixed to the uncut support.

In zone 8 and in the portion of zone 7 downstream of the dies 74 of the process shown in FIG. 1, the matrix 78, around the perfume doped polymer pouch labels 66 is stripped away. As shown in FIG. 10 by the empty spaces, the matrix 78 consists of the portions of the top and bottom barrier members 50 and 24 which surround the area of each perfume pouch label 66 and the underlying adhesive layer 40. After the matrix 78 is pulled away, (the matrix 78 may be wound on roll 80 and then discarded), separate raised areas of perfume doped pouch labels 66 are left, facilitating later sampling of the perfume contained in each pouch.

In zone 9 of the process shown in FIG. 1, the support web 20 containing the manufactured perfume pouch labels 66 is slit as by a rotary knife 82 to form strips such as the strips 83 and 84 containing one or more rows of pouch labels 66. Each strip (two being shown in FIG. 1) is then wound onto a roll such as the rolls 86 and 88, as shown in FIG. 1, thereby completing the method of manufacture.

FIG. 2 shows the finished product resulting from these operations before the support web 20 is slit and the resulting strips 83 and 84 are wound onto rolls 86 and 88. The perfume pouch labels 66 sit upon the support web 20 like pressure sensitive labels. This product configuration readily permits high speed application from the rolls 86 and 88 to magazine pages during or before binding of the magazine. Because of the release liner of the support web 20, the pouch labels 66 can be readily transferred from the web 20 onto a properly positioned page by rapidly drawing the web over a support roller which turns the web to move at a substantial angle (e.g., ninety degrees) to its original direction. Suction may also be employed to aid in transfer of the labels.

Figure 12:
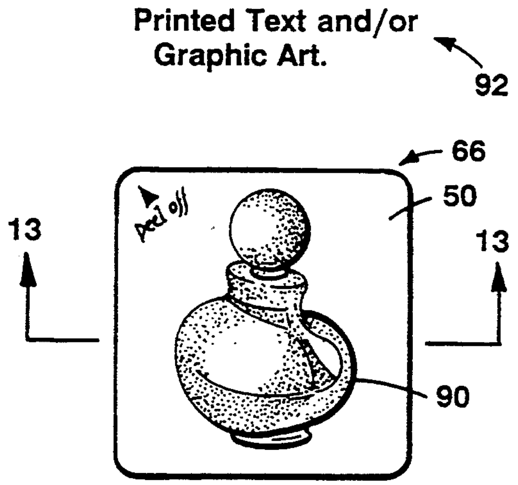
FIG. 12 is a schematic diagram of a perfume pouch label, with artwork, as it might be attached to a page of a magazine or magazine insert, for customer viewing and sampling.

As shown in FIG. 12, the perfume pouch label 66 with artwork 90 on its top barrier member, is firmly attached by adhesive to an advertisement 92 of a magazine page. A reader may sample the perfume in the perfume pouch label by peeling the top barrier member 50 from the pouch, allowing the perfume vapors or fragrance to emanate from the perfume patch of the pouch label.

As indicated above, a preferred perfume pouch label or perfume pouch includes a perfume-doped or fragrance-laden oligomer sealed between bottom and top barrier films. Suitable fragrance-laden oligomers include the following materials in the approximate amounts by weight percent: fragrance oil (10 to 50), polyurethane oligomer (50 to 90), and photoinitiator (1 to 10). The amounts may be varied within the indicated ranges to maximize the aroma and cure speed flexibility of the fragrance-laden oligomer, and the flexibility of the perfume pouch label (for ease of affixing to magazine pages and other surfaces with automated equipment).

Preferred oligomers to which perfume or fragrance oil is added to form a fragrance-laden oligomer are the U.V.-curable polyurethane oligomers disclosed in U.S. Pat. No. 4,880,690 and U.S. Pat. No. 4,483,759. This oligomer is a member of a general class of compounds having the following general structure:

C—B—A—B—C where "A" is a polyether polyol of molecular weight in the range of about 500 to 3000, "B" is an aliphatic diisocyanate, and "C" is an acrylate having both a vinyl group and a hydroxyl group. Common polyether polyols are polyethylene glycol (PEG), polypropylene (PPG), and polytetramethylene glycol (PTMEG); suitable diisocyanates are isophorone diisocyanate (IPDI), hexamethylene diisocyanate (HDI), cyclohexyl diisocyanate (CHDI), and dicyclohexyl methane diisocyanate (HMDI); and suitable acrylates are hydroxyethyl methacrylate (HEMA) and hydroxyethyl acrylate. A photoinitiator is also added to the oligomer to create stable "free radicals" and speed up the polymerization of the oligomer in the presence of U.V. radiation. Suitable photoinitiators include benzophenone, acetophenone, 4-morpholino benzophenone, and 4,4'-bis(dimethylamino)benzophenone. Also added to the oligomer may be a catalyst such as dioctyl tin dilaurate, an optical activator such as silicon oxide, an antioxidant such as Irganox (Ciba Geigy), and a surfactant such as Moda-Flow (Monsanto Chemical Corporation).

One alternative method of forming perfume pouch labels according to this invention is to seal perfumes or fragrance oils between the barrier members without utilizing oligomer. For this embodiment, no curing (zone 3) is required; however, the perfume may be somewhat more likely to transfer to other surfaces (e.g., adjoining page of magazine) during subsequent use.

Another alternative method of forming perfume pouch labels is to seal drops or patches of fragrance-laden polymer gel between the barrier film members without utilizing radiation-curable oligomer. For this embodiment, no curing (zone 3) is required, and rapid "drydown" of the fragrance-laden polymer gel to a solid or semi-solid film upon exposure to air avoids the transfer of liquid to other surfaces after the top barrier film member is peeled for sampling.

Another alternative embodiment is to eliminate the silicone coated paper and adhesive so as to produce individual pouches instead of pouch labels. These pouches could be used as samplers, and would be suitable for direct insertion into magazines by the later application of adhesive; this is known in the trade as "tipping on". If used as individual samplers, the pouches can be stacked and shrink-wrapped in quantities of, for example, 1000 pouches rather than being wound onto rolls as are the pouch labels.

In another embodiment, oligomer patches are bound to the inside (bottom) surface of the top barrier member of each pouch label instead of, or in addition to, the oligomer patches attached to the inside (top) surface of the bottom barrier member. A fragrance layer then remains with the top barrier member when peeled, and this can be removed from the mailer or magazine. Fabrication of this embodiment would involve applying perfume to the inside (bottom) surface of the top barrier member (and curing the oligomer if used) prior to nipping together and sealing the top and bottom barrier members in zones 4 and 5 (FIG. 1).

An alternative packaging method is to seal the top and bottom barrier members or films with a pressure sensitive adhesive or other adhesive, thereby eliminating the necessity of heat sealing. This method is effective, however, only with adhesives which prevent the fragrance from escaping through the adhesive seal over a period of time.

A preferred embodiment of the perfume pouch label utilizes a specific fragrance-laden polymer gel sealed between barrier members instead of a perfume doped U.V.-curable oligomer. To be suitable for use in the perfume pouch label or sampler of the present invention, the polymer gel must have several characteristics, including: 1) no alteration of the quality or fidelity of the fragrance of the perfume or fragrance oil included; 2) constituents soluble in each other in the proportions utilized; 3) viscosity such that it can readily be formulated by mixing and dispensed onto a web as a coating; 4) capable of rapidly releasing fragrance and drying to solid or semi-solid film upon exposure to air; and 5) non-toxic. Desirably, the polymer gel is also transparent or translucent to permit viewing (after removal of the upper barrier member) of the portion of artwork to which its bottom barrier may be adhered; and preferably it's also relatively inexpensive so that the pouch samplers of which it is a part can be made in quantity at low cost. A preferred polymer is one which is individually soluble in water, in ethyl alcohol, and in various fragrance oils in amounts of 0.1 to 10 percent by weight. A preferred polymer gel is a mixture of the following constituents in the proportions given: fragrance oil, about 10 to 40 percent by weight; ethyl alcohol (ethanol), about 30 to 70 percent by weight; modified cellulosic, about 0.1 to 10 percent by weight; antioxidant (0 to 0.1 percent by weight); and the balance water.

The fragrance oil may be any of many essential oils, essences, or scented concentrates available as trademarked products from companies in the fragrance and food businesses, or their suppliers—such as "Escape" from Calvin Klein of New York City, N.Y., or Orange from Neutron Industries of Phoenix, Ariz.. The term "fragrance oil" is thus used herein to include any of various liquids with volatile scents.

Suitable modified cellulosics for use in the polymer gel include: 1) ethyl cellulose, 2) hydroxypropyl cellulose, 3) hydroxyethyl cellulose; 4) methyl cellulose; 5) carboxymethyl cellulose; 6) the sodium salt of carboxymethyl cellulose; and mixtures of two or more of the foregoing. These cellulosics are specific well-known poly-sugars with "1–6" linkages, and have varying solubilities in water and alcohol (#1 having the least solubility in water (and most in ethyl alcohol), and #6 having the most solubility in water and the least in ethyl alcohol). Another polymer which may be utilized (though somewhat more expensive than the modified cellulosics) is polygalactronic acid).

The antioxidant may be any of several suitable for use in cosmetics, including: butylated hydroxy toluene (BHT); tert-butyl hydroquinone (TBHQ); mixed tocopherols (vitamin E); citric acid/sodium titrate; or ascorbic acid/sodium ascorbate (vitamin C). The antioxidant helps stabilize the polymer gel by scavenging oxygen and by chelating metal ions which can catalyze oxidative reactions, thereby increasing the shelf life of the fragrance sampler (since some oxygen will eventually penetrate even a well-sealed pouch).

Two examples of the formulations of fragrance-laden polymer gels prepared for use in perfume pouch samplers are as follows:

| Ingredient | Percent (by weight) |
|---|---|
| Gel #1 | |
| Fragrance oil - Escape (Calvin Klein) | 25 |
| Ethyl alcohol - (SD-39C, Aapaper Corp., Shelbyville, Kentucky) | 50 |
| Hydroxypropyl cellulose (MF/NF, Aqualon Corp., Wilmington, Deleware) | 4.9 |
| BHT antioxidant (Sigma Corp., Saint Louis, Missouri) | 0.1 |
| Water | 20 |
| Gel #2 | |
| Fragrance oil - Orange (Neutron Industries) | 30 |
| Ethyl alcohol - (Aapaper Corp, SD-39C) | 0 |
| Ethyl Cellulose (Aqualon Corp., N22-NF) | 4.9 |
| BHT antioxidant (Sigma, B-1378) | 0.1 |
| Water | 5 |

A preferred way of preparing either of the above-referenced fragrance-laden polymer gels #1 and #2 is to mix it in a batch of about 300 pounds in a polyethylene drum using a rolling mixer. All ingredients except the fragrance oil are first mixed together to form a premix. The fragrance oil is then added to the premix and rolled until a homogeneous mixture is obtained.

Pouch labels were formed by applying gel #1 to two different bottom barrier films and heat-sealing a top barrier film over the gel-laden bottom barrier film. The top barrier film of each label was a laminate supplied by Cadillac Products Inc., of Atlanta, Ga.) comprised of the following, from bottom to top: a 0.0001 inch thick layer of low-density polyethylene, a 0.0003 inch thick layer of aluminum foil, a 0.001 inch thick layer of white pigmented polyethylene, and a layer of 48-gauge plastic (Mylar) material. The bottom barrier film, applied to an adhesive-coated release liner (silicone-coated 30# paper coated with acrylic pressure-sensitive adhesive supplied by Flexcon Corp., Spencer, Mass.), was either of two types of laminate comprised of the following, from bottom to top: 1) a layer of 48 gauge polyester and a 0.002 inch layer of "Rayopeel" meltable sealant (supplied by UCB Medical Industries of Bloomfield, Conn.; or 2) a layer of 48 gauge Mylar plastic, a 0.0003 inch layer of aluminum foil, and a 0.002 inch layer of "Rayopeel" meltable sealant. Use of bottom barrier film #2 results in pouch samplers with aluminum foil in both top and bottom barrier films; this provides an improved barrier against leakage of the fragrance laden polymer gel and against entry of oxygen into the pouch label, but prevents viewing of artwork over which the pouch may be positioned, and is somewhat more expensive than bottom barrier film #1.

Figure 13:
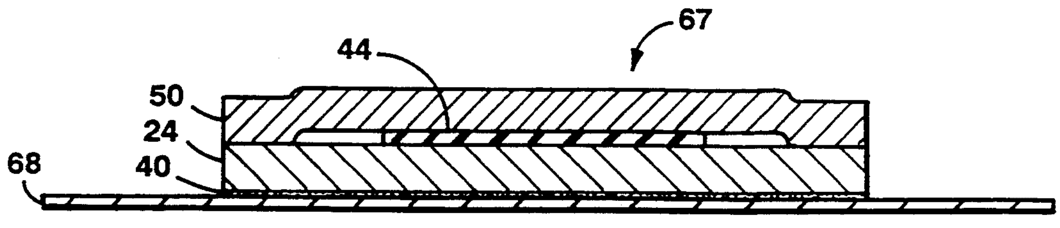
FIG. 13 is a cross-sectional view of the pouch label taken along line 13—13 of FIG. 12.

Gel #1 was applied in amounts of about 20–100 milligrams by dispensing drops of the gel onto the moving web of bottom barrier film utilizing air pressure to drive the gel and timed valves to control the amount and synchronous placement of each drop in the desired position. The bottom barrier film (and the adhesive-coated release liner below it) and top barrier film were hermetically sealed by means of a die such as that shown in FIG. 9, forming thin pouch labels about 2 inches by 2 inches in size. Artwork was then applied to the top of the top barrier film and the pouch labels were attached to magazine inserts, forming structures as illustrated in FIGS. 12 and 13. The labels were found to be well-sealed and to accurately release fragrance, and dry to solid or semi-solid form within about 30 to 60 seconds, when subsequently sampled by peeling the top barrier film from the labels.

FIG. 13 is a cross-sectional view of a single fragrance-laden pouch label 66 attached to a magazine insert page 68 and showing various components of the pouch label including the adhesive 40, the bottom barrier film 24, the peelable top barrier film 50, and the polymer gel 44 sealed within the pouch label (for simplicity of illustration the multiple laminate layers of the bottom and top barrier films 24 and 50 are not individually shown in FIG. 13). Removal of the top barrier film 50 by peeling results in an immediate release of fragrance vapors from the polymer gel and rapid drydown of the gel to a solid or semi-solid film. Because the gel and bottom barrier film are substantially transparent, artwork on the magazine insert page 68 immediately below the pouch label 66 is readily visible through the pouch label 66 after removal of the top barrier film 50. If the artwork on the top barrier film 50 is designed so as to be identical to that immediately below the pouch label 66, the appearance of the magazine insert page 68 remains unchanged upon removal of the top barrier film 50.

Perfume pouch labels were also formed according to the above-described procedure utilizing gel #2, bottom barrier film #2 (and an adhesive-coated release liner), and the above-noted top barrier film. In addition, perfume pouches were formed with gel #1, the above-described top barrier film, and bottom barrier film #2, but without affixing the bottom barrier film to an adhesive-coated release liner. Such pouches were then available for use as individual samplers or attachment to articles by subsequent application of adhesive.

Other perfume pouch labels were made as described in the following additional non-limiting examples:

EXAMPLE 1

A roll of about 1500 perfume pouch labels was prepared utilizing as a starting material a silicone coated release liner 20 from James River Corporation consisting of 30# paper coated on one side with silicone and a generic pressure-sensitive acrylic-adhesive layer 40. A laminate of polyethylene 24', nylon 24'', polyethylene 24''', (total thickness about 0.003 inch, with nylon comprising about 10% of thickness) from James River Corporation was laid down on the silicone and adhesive coated release liner 20. A fragrance-doped polyurethane having a thickness of about 0.0015 inches containing a polyurethane oligomer (see Example in U.S. Pat. No. 4,880,690 for manufacture of oligomer) was printed onto the top surface of laminate 24. The fragrance-doped polyurethane consisted of, by weight, about 73% oligomer, 25% Calvin Klein Obsession fragrance, and 2% photoinitiator (Irgacure 651 from Ciba-Geigy Corporation of Hawthorne, N.Y.). The oligomer patches were cured by ultraviolet radiation during travel (at web speed of about 80 feet per minute) past a lamp providing radiation at an intensity of about 200 watts per inch. A top barter film 50 about 0.004 inches thick from American Packaging Corporation and consisting of a laminate of 26#paper 50', polyethylene 50'', aluminum foil (0.0003 inch thick) 50''', and polyethylene 50'''', coated with the low melting temperature polymer EVA (ethylene vinyl acetate) 50''''' was applied to the top surface of the structure. The top and bottom laminates 50 and 24 were heat sealed with a rotary die, printed with single color text, then die cuts were made and the matrix 78 was peeled away. About 1500 units of the finished pouch labels were wound for storage onto a twelve-inch diameter roll with three-inch core. The pouch labels were later successfully transferred from the roll to magazine pages, utilizing standard label transfer machinery.

EXAMPLE 2

Figure 11:
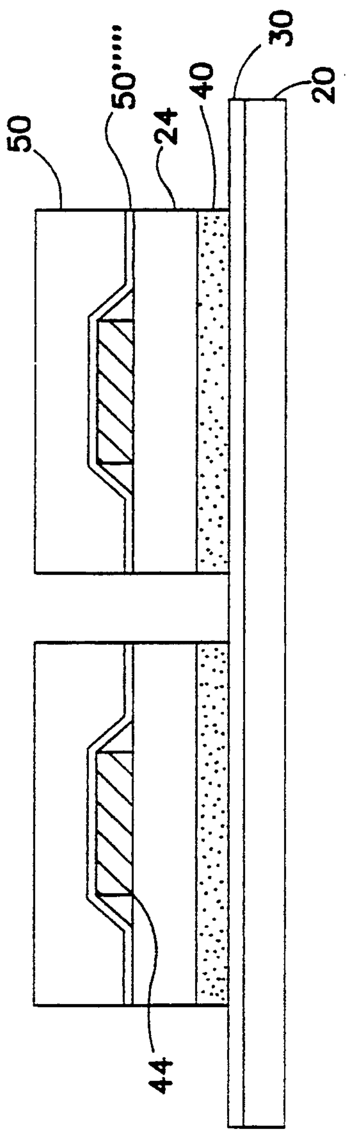
FIG. 11 is a cross-sectional view of the product carried by the support web after the matrix outside the perfume-containing areas of the pouch labels has been stripped away leaving separated perfume pouch labels and is similar to a cross section taken along line 11—11 of FIG. 2.

Printed perfume pouch labels were produced, essentially according to the above-described steps for zones 1 through 9, on a continuous support web that enabled the labels to be dispensed and affixed to a moving web, or to individual sheets, at high speed using conventional automatic labelling equipment. The continuous support web (item 20 in FIG. 11), known in the trade as a release liner, comprised 30# paper coated with a castable silicone and was supplied by Daubert Coated Products, Westchester, Ill. The top surface of the release liner was coated to a thickness of about 0.002 inches with an acrylic pressure-sensitive adhesive (item 40 in FIG. 11) supplied by Flexcon Corp., Spencer, Mass.. Thereafter, the adhesive-coated release liner was nipped together with a bottom barrier film 24 supplied by the James River Corp. of Dayton, Ohio, and comprising a three-layer laminate of low-density polyethylene (0.0015 inches thick), nylon (0.0003 inches thick), and low-density polyethylene (0.0015 inches thick). A fragrance-laden oligomer was then applied to the bottom barrier film by zone-coating patches to a depth of about 0.015 inches using 40–60 milligrams of oligomer per pouch label, the fragrance-laden oligomer consisting of a mixture of: (1) 73 percent by weight of an oligomer substantially as described in the Example 1 at column 6, lines 10–36 of U.S. Pat. No. 4,483,759 (assigned to the assignee of the present invention, and whose disclosure is incorporated herein by reference to that patent), except in making the oligomer the photoinitiator DEAP was omitted to provide improved shelf-life of the oligomer, and the percentages of other principal ingredients were increased substantially in proportion to the amounts set forth in Example 1 of U.S. Pat. No. 4,483,759 to total 100 percent; (2) 25 percent by weight of Escape fragrance oil (Calvin Klein); and (3) 2 percent by weight of Irgacure 651 photoinitiator (Ciba-Geigy). The fragrance-laden oligomer patches were cured with U.V. radiation, and then a top barrier film 50 was nipped with the structure carrying the cured patches and heat-sealed using a die (except for a corner tab in the top comer). The top barrier film 50 consisted of a laminate (from bottom to top) of (1) low-density polyethylene (0.001 inches thick), (2) aluminum foil (0.0003 inches thick), (3) low-density polyethylene (0.001 inches thick), and (4) 26# paper (known in the trade as Lidding stock), the bottom of which was coated with ethylene vinyl acetate (EVA) sealant to allow the top and bottom barrier films to be heat-sealed together with a peelable sealant. After the barrier films were sealed together, artwork was printed on the Lidding stock, dies were used to "kiss cut" the resulting structure, and excess materials were stripped away leaving fragrance-laden pouch labels on the support web.

While the foregoing invention has been described with reference to its preferred embodiments, it is not limited to such forms. For example, the printing performed in zone 6 can be performed earlier in the process, e.g. prior to heat-sealing, or as a separate operation in preparing the top barrier member wound onto and supplied as a roll 54. The invention includes all embodiments and their equivalents within the scope of the appended claims.

What is claimed is:

1. a fragrance-laden pouch for sampling of fragrances comprising:

(a) a bottom barrier film member;

(b) a top barrier film member hermetically and releasably joined to said bottom barrier member to form an enclosure;

(c) a fragrance-laden polymer contained within said enclosure and in contact with said top and bottom barrier film members, said fragrance-laden polymer gel comprising, by weight, 10 to 40 percent of a fragrance oil, 30 to 70 percent ethyl alcohol, 0.1 to 10 percent of a polymer 0 to 0.1 percent of an antioxidant, balance water; and (d) means for separating said top barrier film member from said bottom barrier film member to permit release of fragrance from said enclosure.

2. A fragrance-laden pouch as in claim 1 wherein said polymer is a modified cellulosic selected from the group consisting of ethyl cellulose, hydroxypropyl cellulose, hydroxyethyl cellulose, methyl cellulose, carboxymethyl cellulose, the sodium salt of carboxymethyl cellulose, and mixtures thereof.

3. A fragrance-laden pouch as in claim 1 wherein said polymer gel comprises, by weight, 20 to 35 percent fragrance oil, 45 to 65 percent ethyl alcohol, 4 to 8 percent modified cellulosic, 0.05 to 0.1 percent antioxidant, balance water.

4. A fragrance-laden pouch as in claim 1 wherein said antioxidant is butylated hydroxy toluene (BHT) in an amount of about 0.1 percent by weight of said polymer gel.

5. A fragrance-laden pouch as in claim 1 wherein said polymer gel comprises, by weight, about 25 percent fragrance oil, about 50 percent ethyl alcohol, about 5 percent hydroxypropyl cellulose, about 0.1 percent butylated hydroxy toluene (BHT), and about 20 percent water.

6. A fragrance-laden pouch as in claim 1 wherein said top barrier film member comprises a laminate of the following, from bottom to top, a first layer of polyethylene, a layer of aluminum foil, a second layer of polyethylene, and a layer of plastic material.

7. A fragrance-laden pouch as in claim 1 wherein said bottom barrier film member comprises a laminate of, from bottom to top, a layer of polyester and a layer of meltable sealant.

8. A fragrance-laden pouch label for sampling of fragrances comprising:

(a) a bottom barrier film member;

(b) an adhesive coating on the lower surface of said bottom barrier film member;

(c) a top barrier film member releasably and hermetically joined to the top of said bottom barrier film member to form an enclosure;

(d) a fragrance-laden article sealed within said enclosure, said fragrance-laden article being either (i) in solid or semi-solid form, or (ii) dryable to solid or semi-solid form by release of volatiles contained in said fragrance-laden article within less than one minute after exposure of said fragrance-laden article to air upon separation of said top barrier film member from said bottom barrier film member; and (e) means for separating said top barrier film member from said bottom barrier film member to release fragrance from said enclosure.

9. A fragrance-laden pouch label as in claim 8 wherein said adhesive coating, said bottom barrier film member, and said fragrance-laden article are transparent or translucent.

10. A fragrance-laden pouch label as in claim 9 wherein said top barrier film member has artwork printed on its upper surface.

11. A fragrance-laden pouch label as in claim 8 wherein said fragrance-laden article is a fragrance-laden polymer gel comprising, by weight, (i) 10 to 40 percent of a fragrance oil, (ii) 0.1 to 10 percent of a polymer individually soluble in said fragrance oil, in ethyl alcohol, and in water, (iii) 30 to 70 percent ethyl alcohol, (iv) 0 to 0.1 percent of an antioxidant, and (v) balance water.

12. A fragrance-laden pouch label as in claim 11 wherein said polymer comprises a modified cellulosic selected from the group consisting of ethyl cellulose, hydropropyl cellulose, methyl cellulose, carboxymethyl cellulose, the sodium salt of carbomethyl cellulose, and mixtures thereof.

13. A fragrance-laden pouch label as in claim 9 wherein said bottom barrier film member comprises a laminate of, from bottom to top, a layer of polyester and a layer of meltable sealant.

14. A fragrance-laden pouch label as in claim 8 wherein said bottom barrier film member comprises a laminate of, from bottom to top, a layer of plastic material, a layer of aluminum foil, and a layer of meltable sealant.

15. A fragrance-laden pouch label as in claim 11 wherein said polymer gel comprises, in weight percent, about 30 percent fragrance oil, about 60 percent ethyl alcohol, about 5 percent ethyl cellulose, about 0.1 percent butylated hydroxy toluene (BHT), and about 5 percent water.

16. A fragrance-laden pouch label according to claim 15 wherein said bottom barrier film member comprises a laminate of, from bottom to top, a layer of plastic material, a layer of aluminum foil, and a layer of meltable sealant.

17. A fragrance-laden pouch for sampling of fragrances comprising:

(a) a bottom barrier film member;

(b) a top barrier film member hermetically and releasably joined to said bottom barrier member to form an enclosure;

(c) a fragrance-laden article sealed within said enclosure, said fragrance-laden article being either (i) in solid or semi-solid form, or (ii) dryable to solid or semi-solid form by release of volatiles contained in said fragrance-laden article within less than one minute after exposure of said fragrance-laden article to air upon separation of said top barrier film member from said bottom barrier film member; and (d) means for separating said top barrier film member from said bottom barrier film member to release fragrance from said enclosure.

18. a fragrance-laden pouch for sampling of fragrances comprising:

(a) a bottom barrier film member;

(b) a top barrier film member hermetically and releasably joined to said bottom barrier member to form an enclosure;

(c) fragrance contained within said enclosure and in contact with said top and bottom barrier film members; and (d) means for separating said top barrier film member from said bottom barrier film member to permit release of fragrance from said enclosure.

19. A fragrance-laden pouch label for sampling of fragrances comprising:

(a) a bottom barrier film member;

(b) an adhesive coating on the lower surface of said bottom barrier film member;

(c) a top barrier film member releasably and hermetically joined to the top of said bottom barrier film member to form an enclosure;

(d) fragrance contained within said enclosure and in contact with said top and bottom barrier film members; and (e) means for separating said top barrier film member from said bottom barrier film member to release fragrance from said enclosure.

20. A fragrance-laden pouch label as in claim 19 wherein said top barrier film member has artwork printed on its upper surface.

21. A transparent or translucent fragrance-laden pouch label for sampling of fragrances comprising:

(a) a transparent or translucent bottom barrier film member;

(b) a transparent or translucent adhesive coating on the lower surface of said bottom barrier film member;

(c) a top barrier film member releasably joined to the top of said bottom barrier film member to form an enclosure, said top barrier film member having artwork printed on its upper surface configured to match or become part of a larger artwork on an article to which said pouch label is attachable by means of said adhesive coating;

(d) fragrance contained within said enclosure; and (e) means for separating said top barrier film member from said bottom barrier film member to release fragrance from said enclosure.

22. The pouch label of claim 21 wherein said top barrier film member is hermetically joined to the top of said bottom barrier film member.

23. The pouch label of claim 22 wherein said fragrance is in contact with said top and bottom barrier film members.

* * * * *

UNITED STATES PATENT AND TRADEMARK OFFICE

CERTIFICATE OF CORRECTION

PATENT NO. : 5,391,420
DATED : February 21, 1995
INVENTOR(S) : Matthew W. Bootman et al.

It is certified that error appears in the above-indentified patent and that said Letters Patent is hereby corrected as shown below:

Column 3, line 37, "comer" should be --corner--.
Column 6, line 60, "comer" should be --corner--.
Column 7, line 2, "comers" should be --corners--.
Column 9, line 68, "titrate" should be --citrate--.
Column 11, lines 20-21, "flagrance" should be --fragrance--.
Column 12, line 55, "comer" should be --corner--.
Column 13, line 11, "a" should be --A--.
Column 13, line 17, after "polymer", insert --gel--.
Column 14, line 66, "a" should be --A--.

Signed and Sealed this

Sixteenth Day of July, 1996

Attest:

Bruce Lehman

BRUCE LEHMAN

*Attesting Officer*

*Commissioner of Patents and Trademarks*